United States Patent
Ni et al.

(10) Patent No.: US 11,068,474 B2
(45) Date of Patent: Jul. 20, 2021

(54) SEQUENCE TO SEQUENCE CONVERSATIONAL QUERY UNDERSTANDING

(71) Applicant: Microsoft Technology Licensing, LLC, Redmond, WA (US)

(72) Inventors: Xiaochuan Ni, Redmond, WA (US); Jiarui Ren, Redmond, WA (US); Manish Malik, Redmond, WA (US); Qifa Ke, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 386 days.

(21) Appl. No.: 15/918,838

(22) Filed: Mar. 12, 2018

(65) Prior Publication Data

US 2019/0278857 A1    Sep. 12, 2019

(51) Int. Cl.
| | | |
|---|---|---|
| G06F 16/00 | (2019.01) | |
| G06F 16/242 | (2019.01) | |
| G06N 3/08 | (2006.01) | |
| G06N 3/04 | (2006.01) | |
| G06F 16/33 | (2019.01) | |
| G06F 40/35 | (2020.01) | |

(52) U.S. Cl.
CPC ........ *G06F 16/2425* (2019.01); *G06F 16/243* (2019.01); *G06F 16/3338* (2019.01); *G06F 16/3344* (2019.01); *G06F 16/3349* (2019.01); *G06F 40/35* (2020.01); *G06N 3/0445* (2013.01); *G06N 3/0454* (2013.01); *G06N 3/08* (2013.01)

(58) Field of Classification Search
CPC ............... G06F 16/2425; G06F 16/243; G06F 16/3338; G06F 16/3344; G06F 16/3349; G06F 40/35; G06N 3/0445; G06N 3/0454; G06N 3/08
See application file for complete search history.

(56) References Cited

U.S. PATENT DOCUMENTS

| | | | | |
|---|---|---|---|---|
| 5,987,457 A | * | 11/1999 | Ballard | G06F 16/9535 |
| 6,175,829 B1 | * | 1/2001 | Li | G06F 16/58 |
| 7,603,349 B1 | * | 10/2009 | Kraft | G06Q 10/10 |
| 8,849,785 B1 | * | 9/2014 | Shattuck | G06F 16/3325 |
| | | | | 707/706 |
| 2007/0266002 A1 | * | 11/2007 | Chowdhury | G06F 16/3326 |

(Continued)

OTHER PUBLICATIONS

Jeff Huang et al., "Analyzing and Evaluating Query Reformulation Strategies in Web Search Logs", Nov. 2, 2009, ACM, pp. 77-86 (Year: 2009).*

(Continued)

*Primary Examiner* — Jared M Bibbee
(74) *Attorney, Agent, or Firm* — Medley, Behrens & Lewis, LLC

(57) ABSTRACT

Systems and techniques for sequence to sequence conversational query understanding are described herein. A query may be received that includes multiple words. It may be identified that the query is to be reformulated based on an attention value for an attention word in the query. Relationships may be determined among words of the query and words in a previously submitted query and words in results from the previously submitted query. The query may be reformulated based on the relationships. The reformulated query may be employed to retrieve query results.

20 Claims, 8 Drawing Sheets

(56) References Cited

U.S. PATENT DOCUMENTS

| | | | | |
|---|---|---|---|---|
| 2012/0096042 | A1* | 4/2012 | Brockett | G06F 16/24534 |
| | | | | 707/798 |
| 2014/0172901 | A1* | 6/2014 | Shukla | G06F 16/3338 |
| | | | | 707/765 |
| 2014/0214840 | A1* | 7/2014 | Gupta | G06F 16/3322 |
| | | | | 707/738 |
| 2014/0257792 | A1 | 9/2014 | Gandrabur et al. | |
| 2014/0258303 | A1* | 9/2014 | Gollapudi | G06F 16/951 |
| | | | | 707/740 |
| 2016/0224666 | A1* | 8/2016 | Horvitz | G06F 16/951 |
| 2016/0267128 | A1* | 9/2016 | Dumoulin | G06F 16/243 |
| 2017/0372200 | A1 | 12/2017 | Chen et al. | |
| 2018/0341716 | A1* | 11/2018 | Iyer | G06F 16/951 |
| 2019/0155929 | A1* | 5/2019 | Kapoor | G06F 16/3338 |

OTHER PUBLICATIONS

Junjie Yao et al, "Keyword Query Reformulation on Structured Data", IEEE, pp. 953-964 (Year: 2012).*

"International Search Report and Written Opinion Issued In PCT Application No. PCT/US19/020849", dated Jun. 14, 2019, 13 Pages.

Bachrach, et al. "An Attention Mechanism for Neural Answer Selection Using a Combined Global and Local View", In Journal of The Computing Research Repository, Jul. 5, 2017, 8 Pages.

Ren, et al. "Conversational Query Understanding Using Sequence to Sequence Modeling", In Proceedings of The 2018 World Wide Web Conference on World Wide Web, Apr. 23, 2018, 10 Pages.

Bahdanau, et al., "Neural Machine Translation by Jointly Learning to Align and Translate", published as a conference paper at ICLR 2015, pp. 1-15.

Bengio, Yoshua, "Practical Recommendations for Gradient-Based Training of Deep Architectures", In Journal of Computing Research Repository, Sep. 16, 2012, pp. 1-33.

Bois, et al., "Santa Barbara Corpus of Spoken American English Part 1-4", In Linguistic Data Consortium, Jan. 1, 2000, 10 Pages.

Cao, et al., "Context-Aware Query Suggestion by Mining Click-Through and Session Data", In Proceedings of the 14th ACM SIGKDD international conference on Knowledge discovery and data mining, Aug. 24, 2008, pp. 875-883.

Cao, et al., "Towards context-aware search by learning a very large variable length hidden markov model from search logs", In Proceedings of 18th International Conference on World Wide Web, Apr. 20, 2009, pp. 191-200.

Cho, et al., "Learning phrase representations using RNN encoder-decoder for statistical machine translation", In Proceedings of Conference on Empirical Methods in Natural Language Processing, Oct. 25, 2014, 15 Pages.

Cho, et al., "On the Properties of Neural Machine Translation: Encoder-Decoder Approaches", In Journal of Computing Research Repository, Sep. 2014, 9 Pages.

Chung, et al., "Empirical evaluation of gated recurrent neural networks on sequence modeling", In Journal of Computing Research Repository, Dec. 11, 2014, pp. 1-9.

Clark, et al., "Deep Reinforcement Learning for Mention-Ranking Coreference Models", In Journal of Computing Research Repository, Sep. 2016, 7 Pages.

Danescu-Niculescu-Mizil, et al., "Echoes of power: Language effects and power differences in social interaction", In Proceedings of International World Wide Web Conference, Apr. 16, 2012, 10 Pages.

Dhingra, et al., "Towards End-to-End Reinforcement Learning of Dialogue Agents for Information Access", In Proceedings of 55th Annual Meeting of Association for Computational Linguistics, vol. 1, Apr. 20, 2017, 12 Pages.

Press, Gil, "AI By The Numbers: 33 Facts And Forecasts About Chatbots And Voice Assistants", Retreived From: <<https://www.forbes.com/sites/gilpress/2017/05/15/ai-by-the-numbers-33-facts-and-forecasts-about-chatbots-and-voice-assistants>>, May 15, 2017, 3 Pages.

Grbovic, et al., "Context- and Content-aware Embeddings for Query Rewriting in Sponsored Search", In Proceedings of 38th International ACM SIGIR Conference on Research and Development in Information Retrieval, Aug. 9, 2015, pp. 383-392.

Gulcehre, et al., "Pointing the Unknown Words", In Journal of Computing Research Repository, Mar. 2016, 10 Pages.

He, et al., "Learning to Rewrite Queries", In Proceedings of 25th ACM International on Conference on Information and Knowledge Management, Oct. 24, 2016, pp. 1443-1452.

Hochreiter, et al., "Long Short-Term Memory", In Journal of Neural Computation, vol. 9, Issue 8, Nov. 15, 1997, pp. 1735-1780.

Kim, et al., "The Fourth Dialog State Tracking Challenge", In Proceedings of Dialogues with Social Robots—Enablements, Analyses, and Evaluation, Seventh International Workshop on Spoken Dialogue Systems, Jan. 13, 2016, pp. 1-14.

Li, et al., "Exploring Query Auto-Completion and Click Logs for Contextual-Aware Web Search and Query Suggestion", In Proceedings of 26th International Conference on World Wide Web, Apr. 3, 2017, pp. 539-548.

Li, et al., "Learning parametric models for context-aware query auto-completion via hawkes processes", In Proceedings of Tenth ACM International Conference on Web Search and Data Mining, Feb. 6, 2017, pp. 131-139.

Luong, et al., "Effective approaches to attention-based neural machine translation", In Proceedings of Conference on Empirical Methods in Natural Language Processing, Sep. 17, 2015, 11 Pages.

Manning, et al., "The Stanford CoreNLP Natural Language Processing Toolkit", In Proceedings of 52nd Annual Meeting of the Association for Computational Linguistics, Jun. 22, 2014, 6 Pages.

Papineni, et al., "BLEU: a method for automatic evaluation of machine translation", In Proceedings of 40th Annual Meeting on Association for Computational Linguistics, Jul. 6, 2002, pp. 311-318.

Pennington, et al., "Glove: Global vectors for word representation", In Proceedings of Conference on Empirical Methods in Natural Language Processing, Oct. 25, 2014, pp. 1532-1543.

Prakash, et al., "Neural Paraphrase Generation with Stacked Residual LSTM Networks", In Journal of Computing Research Repository, Oct. 2016, 12 Pages.

Banchs, Rafael E., "Movie-DiC: a Movie Dialogue Corpus for Research and Development", In Proceedings of the 50th Annual Meeting of the Association for Computational Linguistics, Jul. 8, 2012, pp. 203-207.

Raiman, et al., "Globally Normalized Reader", In Proceedings of the Conference on Empirical Methods in Natural Language Processing, Sep. 9, 2017, 11 Pages.

Lowe, et al., "The Ubuntu Dialogue Corpus: A Large Dataset for Research in Unstructured Multi-Turn Dialogue Systems", In Journal of Computing Research Repository, vol. 3, Feb. 4, 2016, 10 Pages.

Shen, et al., "Context-Sensitive Information Retrieval Using Implicit Feedback", Proceedings of the 28th Annual International ACM SIGIR Conference on Research and Development in Information Retrieval, Aug. 15, 2005, pp. 43-50.

Singh, et al., "Reinforcement Learning for Spoken Dialogue Systems", In Proceedings of Advances in Neural Information Processing Systems, Nov. 29, 1999, pp. 956-962.

Sordoni, et al., "A hierarchical recurrent encoder-decoder for generative context-aware query suggestion", In Proceedings of 24th ACM International on Conference on Information and Knowledge Management, Oct. 19, 2015, pp. 553-562.

Sordoni, et al., "A Neural Network Approach to Context-Sensitive Generation of Conversational Responses", In Proceedings of Annual Conference of North American Chapter of Association for Computational Linguistics:Human Language Technologies, May 31, 2015, pp. 196-205.

Sun, et al., "Towards context-aware search with right click", In Proceedings of 37th International ACM SIGIR Conference on Research & Development in Information Retrieval, Jul. 6, 2014, pp. 847-850.

Sutskever, et al., "Sequence to sequence learning with neural networks", In Journal of Advances in neural information processing systems, Dec. 8, 2014, pp. 1-9.

(56) References Cited

OTHER PUBLICATIONS

Vinyals, et al., "Grammar as a Foreign Language", In Journal of Computing Research Repository, Dec. 2014, pp. 1-10.
Wang, et al., "Bilateral Multi-Perspective Matching for Natural Language Sentences", In Journal of Computing Research Repository, Feb. 2017, 7 Pages.
Bar-Yossef, et al., "Context-Sensitive Query Auto-Completion", In Proceedings of 20th International Conference on World Wide Web, Mar. 28, 2011, pp. 107-116.

* cited by examiner

SEQUENCE TO SEQUENCE CONVERSATIONAL QUERY UNDERSTANDING

TECHNICAL FIELD

Embodiments described herein generally relate to search query understanding techniques and, in some embodiments, more specifically to conversational query understanding using sequence to sequence modeling.

BACKGROUND

A user may interact with a variety of devices that may allow the user to submit a search query. The user may submit additional search queries. In some instances, the user may interact with a device in a conversational manner in which some context included in the initial search query may be left out of subsequent search queries. The lack of context may lead to inaccurate search results.

Conventional approaches may address paraphrase generation where the goal is to generate a paraphrase for a given sentence. Some conventional techniques have attempted to apply deep learning to paraphrase generation with some success; however, existing techniques may have issues generating paraphrases that depend on context other than the input sentence. In a similar fashion, some existing techniques for dialogue agents may use forms of neural networks and reinforcement learning. However, while these techniques may produce results, they are limited by being very domain specific (e.g., finding a movie, etc.). Thus, the conventional techniques may fail to provide adequate results across information domains.

Some conventional techniques may use context-aware search or context-aware query suggestion for search. Conventional techniques use recent queries to assist query auto-completion. However, the existing techniques are mainly focused on scenarios where a user types in one or very few characters. Other existing techniques focus on query auto-completion via mining/learning from query auto-completion logs.

Conventional techniques are focused on traditional query suggestion tasks where the suggested queries might be related to the input query at concept level. Some traditional techniques are focused on how context may be used to improve retrieval/ranking accuracy such as, for example context-aware query rewriting for sponsored search and using sequence to sequence modeling for query rewriting. However, these traditional techniques target traditional query rewriting tasks where the goal is to alter original query with, for example, synonym expansion to improve retrieval or ranking performance by reducing mismatches.

SUMMARY

Various details for the embodiments of the inventive subject matter are provided in the accompanying drawings and in the detailed description text below. It will be understood that the following section provides summarized examples of some of these embodiments.

Embodiments described herein generally relate to understanding conversational queries received by an information retrieval system (e.g., a personal assistant device, search engine, etc.), and in particular, to techniques and configurations that use context retrieved from previous search queries and results to reformulate a current query that is missing context. Example embodiments discussed herein further relate to using deep machine learning techniques to identify relationships between words or phrases of the context data and the current query and further determine that the current query needs to be reformulated to retrieve relevant results.

An embodiment discussed herein includes operations executed with a processor and memory of a computing system to understand conversational queries, with operations including: receiving a query that includes multiple words; determining relationships among words of the query and words in a previously submitted query and words in results from the previously submitted query, wherein the query is designated to be reformulated based on an attention value for an attention word included in the words of the query; reformulating the query based on the relationships; and employing the reformulated query to retrieve query results. In further examples, the previously submitted query is selected based on a time window prior to receipt of the query.

In further examples, the operations may include: encoding the query to identify the words of the query; calculating an attention value for each word of the query; and determining that the word of the query with the highest attention value lacks context.

Also in further examples, the operations may include: merging the words in the previously submitted query and the words in the results from the previously submitted query into a set of context words; calculating a query word attention value for each attention word of the query and a context word attention value for each member of the set of context words; and matching an attention word of the query to a particular member of the set of context words based on a similarity between the word attention value for the attention word of the query and the context word attention value for the particular member of the set of context words, wherein a relationship is determined based on the matching.

Also in further examples, the operations may include: generating a new query by replacing the attention word in the query with the particular member of the set of context words.

Also in further examples, the operations may include: generating a new query by adding the particular member of the set of context words to the query.

Also in further examples, the operations may include: merging the words in the previously submitted query and the words in results from the previously submitted query into a set of context words; establishing a first long short-term memory unit for a context word of the set of context words and a second long short-term memory unit for an attention word of the query; and creating a merged attention vector using the first long short-term memory unit and the second long short-term memory unit, wherein reformulating the query includes using the merged attention vector.

Also in further examples, the operations may include: processing the words of the query using a first recurrent neural network and processing the words in the previously submitted query and the words in results from the previously submitted query using a second recurrent neural network, wherein the relationships are determined by sequence to sequence modeling using the first recurrent neural network and the second recurrent neural network.

Also in further examples, the operations may include: identifying that the query is to be reformulated based on an attention value for an attention word in the query.

As discussed herein, the logic, commands, or instructions that implement aspects of the electronic operations described above, may be provided in a local computing system or a remote computing system, including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
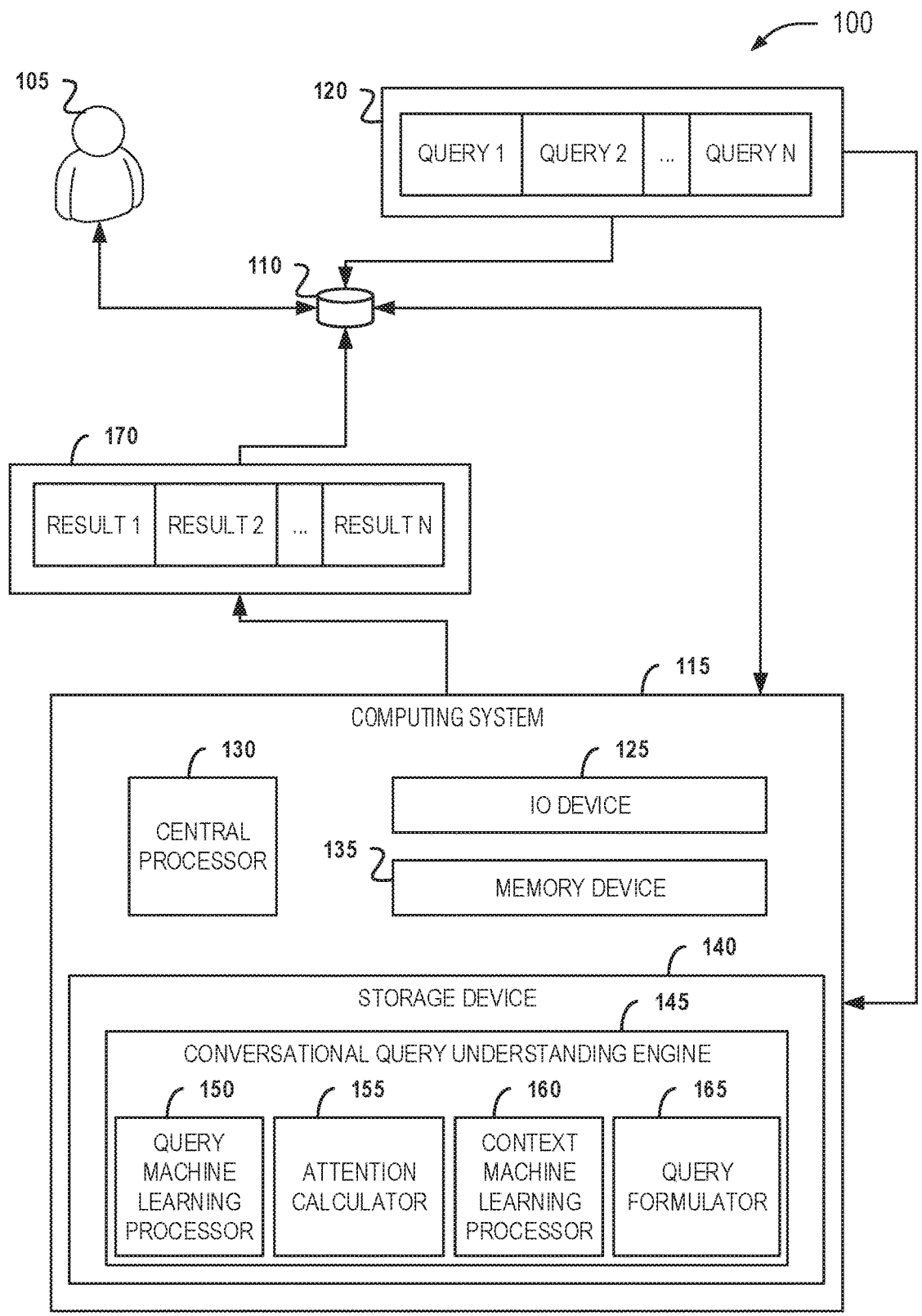
FIG. 1 is a block diagram of an example of an environment and system for sequence to sequence conversational query understanding, according to an embodiment.

The recent rise of technologies such as chatbots, digital personal assistants, and smart home devices has led to much more conversational interactions between humans and machines than ever before. For these technologies, query submission is a common task as a user seeks information from a device. For example, a user may interact with a voice-enabled personal assistant, bots, agents, skills, or interfaces of a personal assistant service that may be a stand-alone device or may operate as a feature of another device such as, for example, a computing device, a smartphone, a tablet computer, a smart watch, etc. The user may seek information and may trigger the virtual assistant (e.g., using a trigger word or other trigger mechanism) and submit a verbal query. For example, the user may ask "what is the weather forecast for today?" The virtual assistant may use natural language processing or other voice recognition techniques to convert the verbal query into a text query which may be used to search for results from a variety of data sources (e.g., search engines, weather databases, electronic information libraries, etc.).

The user may interact with the voice-enabled assistant using natural language as that is how humans generally communicate verbally when interacting with other humans. In conversations, humans naturally ask questions that depend on the context of the current conversation, as conversational queries. In a very basic example, a user may ask "When was California founded?" followed by "Who is its governor?" and "What is the population?", where both the follow up questions refer to California. Some more examples of conversational queries may be seen in Table 1.

TABLE 1

| Previous query | Current conversational query | Current conversational query including the necessary context |
|---|---|---|
| When was California founded? | Who is its governor? | Who is California's governor? |
| When was California founded? | What is the population? | What is the population of California? |
| Is Space Needle in Seattle? | Who is its mayor? | Who is Seattle's mayor? |
| How tall is Kobe Bryant? | What about Lebron James? | How tall is Lebron James? |
| When was the last summer Olympics? | And the winter one? | When was the last winter Olympics? |
| Animals that live in Asia? | And are endangered? | Animals that live in Asia and are endangered? |
| What are the similarities between bacteria and viruses? | What are the differences? | What are the differences between bacteria and viruses? |

Humans make follow-on queries without context because it is tedious to continuously repeat the context and because humans often maintain context during conversational queries. The natural human tendency to omit context in spoken follow-on queries may extend to interactions with conversational technology. The user may not realize the conversational shortcomings of a voice-enabled personal assistant or other conversation technology because omitting context is normal in conversational interactions. However, traditional information retrieval and question answering systems may be designed for stateless or standalone queries resulting in poor conversational query understanding where context is not provided in follow-on queries. Thus, traditional information retrieval and question answering systems may not be able to successfully answer the example current conversational queries (e.g., follow-on queries) presented in Table 1.

The techniques presented herein improve query understanding for conversational searches by addressing various technical processing and analysis problems in the field of conversational query understanding (CQU). To address such issues involving CQU, the present disclosure includes an example process in which queries are analyzed using a context aware query reformulation task that includes determining 1) whether or not the query depends on context from a previous query, and 2) if so, how the query should be reformulated to include the necessary context. This enables conversational queries to be reformulated into search engine compatible standalone queries that may be understood by search engines or other information retrieval and question answering systems. For example, speech-to-text may be used to convert a verbal query into text query string and then the missing context may be used as replacement or additional text in the text query string.

The CQU may be designed with open domain capabilities (e.g., able to provide query understanding not limited to a specific information domain, etc.) to handle a wide variety of queries, both in terms of content, such as tech support or celebrity trivia, and how the queries are phrased, such as natural language queries (e.g. "when was it founded") or search type queries (e.g. "founded when"). For example, the techniques presented herein may provide a CQU solution that may be used across domains. For example, the same CQU engine may be used for movie information retrieval, technical support, and general information queries (e.g., information on people, places, things, etc.). The techniques discussed herein address the challenge of this open domain CQU task. Other challenges addressed include: handling different types of context (e.g., Table 1 shows that the context that needs to be maintained may be an entity, concept, question, etc.); knowing when to reformulate (e.g., "it" does not always refer to previous context); and knowing which part of the context to use (e.g., using "Seattle" instead of "Space Needle" for "Who is its mayor?"). Many conventional rule-based approaches fail to address all of these challenges, therefore a suitable dataset is created and applied using machine learning. Thus, the following examples include (1) defining and presenting enhanced tasks to perform CQU, (2) an open domain and large-scale dataset used to conduct conversational queries, (3) a sequence to sequence based model operable for CQU; and (4) a deep learning model for CQU.

For conversational queries that include an anaphora (e.g., a word referring to or replacing a word used earlier), coreference resolution (e.g., finding all expressions that relate to the same entity) is a related problem. Coreference resolution seeks to resolve an anaphora to the term(s) that it refers to. Conventional techniques for coreference resolution with deep learning has achieved some progress on this challenging task. However, existing coreference resolution systems have several limitations when applied to CQU. The following examples were tried with existing coreference resolution service: (1) Multiple possible entities (e.g., for "Is Space Needle in Seattle? Who is its mayor?", the "its" is incorrectly resolved to "Space" instead of "Seattle"); (2) Knowing when a reformulation is actually needed (e.g. for "When was California founded? How long does it take bruised ribs to heal?", the "it" is incorrectly resolved to "California"); (3) When there isn't an explicit referring anaphora (e.g. for "When was California founded? What is the population?", there is no anaphora in the second query that explicitly refers to "California"). In example (3), queries such as "When was California founded? What is the population?," create a challenge for existing coreference resolution systems. Conventional coreference resolution systems cannot handle the conversational queries that don't have anaphoras like example (3) and some of the examples in Table 1 because there may not be a word or phrase in the current query that bears a direct relationship to a word or phrase in the available context. Thus, the results provided in response to such a query may be unpredictable and inaccurate.

In contrast to traditional techniques that seek to improve query suggestion by mining/learning from search session and click-through logs, the techniques discussed herein use a large and diverse dataset including conversational queries that needed reformulation and queries that did not need reformulation to train machine learning processors for deep learning. The training may establish neural networks that a current query and context may be evaluated to establish relationships to identify if the current query needs to be reformulated and what information from the context is to be included in the current query to retrieve adequate results.

In further examples, the techniques discussed herein use sequence to sequence modeling for deep learning. The present techniques utilize an attention mechanism in combination with sequence to sequence modeling, which improves performance of context determination. Multiple perspective matching is also employed to improve natural language sentence matching. This matching is applied between the query and the context. The solution discussed herein provides conversational query understanding across information domains with an improvement in accuracy resulting from the reformulation of queries with context obtained from previous queries and results. This generalized approach may increase processing performance and reduced system utilization by providing a central conversational query solution without relying on a collection of domain specific query engines.

FIG. 1 is a block diagram of an example of an environment 100 and computing system 115 for sequence to sequence conversational query understanding, according to an embodiment. The environment 100 includes a user 105 that may be interacting with a device 110 (e.g., voice-enabled assistant, computing device, smartphone, table, etc.) that provides information retrieval and query response. The device 110 may be communicatively coupled (e.g., via wireless network, wired network, shared bus, etc.) to the computing system 115. The user 105 may submit a variety of queries 120 that may be received by the computing system 115 via the input/output (IO) device 125. The central processor 130 may work in conjunction with the memory device 135 to execute computer instructions such as those of the conversational query understanding engine 145 stored in the storage device 140. The conversational query understanding engine 145 may include a variety of instructional components such as a query machine learning processor 150, an attention calculator 155, a context machine learning processor 160, and a query formulator 165. The computing system may output a variety of query results 170 based on processing of the queries 120 by the components of the conversational query understanding engine 145.

A query 120 may be received by the computing system 115 (e.g., using the IO device 125, etc.). The query may be processed by the central processor 130 using instructions from the conversational query understanding engine 145 loaded into the memory device 135 from the storage device 140. The query machine learning processor may include a recurrent neural network architecture that may be used in encoding the query into normalized elements (e.g., words, etc.). The normalized elements may be assigned to long short-term units to be evaluated at varying layers of the neural network. The operational architecture of the neural network may be learned through analysis of training data. Additional detail on an example training dataset is provided below in the description of FIG. 2.

The query machine learning processor 150 may identify that the query 120 should be reformulated based on an attention value of a word in the query 120. In an example, the query machine learning processor 150 may encode the query 120 to identify the words of the query 120. The attention calculator 155 may calculate and attention value for each word of the query 120. The query machine learning processor 150 may determine that the word of the query 120 with the highest attention value lacks context. For example, the query machine learning processor 150 may compare the word to a library of anaphoras or general subject words to identify that there is a probable likelihood that the word lacks context. In another example, the query machine learning processor 150 may be trained using the training data and evaluation of the word with highest attention along the layers of the neural network may indicate a likelihood that the word is lacking (e.g., requires additional, different, etc.) context. In yet another example, the query machine learning processor may identify that the word likely lacks context based on search results returned using the word (e.g., many differing results for a word may indicate a likelihood that the word lacks context, etc.).

Upon identifying that the query should be reformulated, the context machine learning processor 160 may process previously submitted queries 120 and results from the previously submitted queries 120. The context machine learning processor 160 may work in conjunction with the attention calculator 155 and the query machine learning processor 150 to determine relationships between words of the query 120 and words in a previously submitted query 120 and words in results from the previously submitted query 120. In an example, the previously submitted query 120 may be selected based on a time window prior to receipt of the query 120.

The conversational query understanding engine 145 may determine that the query needs to be reformulated and may identify missing context in a single step. Thus, the machine learning processors of the conversational query understanding engine 145 may simultaneously determine that the query needs to be reformulated based on missing context and may identify the context missing from the query.

In an example, the words in the previously submitted query 120 and the words in the results from the previously submitted query 120 may be merged into a set of context words. The attention calculator 155 may calculate a query word attention value for each word of the query 120 and a context word attention value for each member of the set of context words. A word of the query 120 may be matched to a member of the set of context words based on a similarity between the word attention value for the word of the query 120 and the context word attention value for the member of the set of context words. The relationship between the query 120 words and the context words may be determined based on the matching.

The query formulator 165 may reformulate or generate a new query 120 based on the relationships. In an example, the query 120 may be reformulated by generation of a new query by replacing the word of the query 120 with the member of the set of context words. In another example, the query 120 may be reformulated by generation of a new query 120 by adding the member of the set of context words to the query 120. The reformulated query may be leveraged to retrieve query results 170 to be presented to the user 105 via the device 110.

Inputs of the conversational query understanding engine 145 may include: context (e.g., conversation history) which includes previous queries 120 and results 170 which are evaluated by the context machine learning processor 160, and current input query 120 which may be evaluated by the query machine learning processor 150. Output of the conversational query understanding engine 145 is a query generated by the query formulator 165 which reformulates the input query by infusing context information which exists in the history but is missing from the current query input.

The conversational query understanding engine 145 may use C to represent conversation history: $C=\{Q_t, A_t\}_{t=-1}^{-K}$ where K represents the window size of looking back at history, $Q_0$ represents current input query, and Q' represents the output after reformulation. The goal of the CQU task is formulated to find a mapping function F to calculate:

$$F(C, Q_0) \rightarrow Q'$$

In addition, both query and answer are comprised of a sequence of words: $Q=\{w_t^Q\}_{t=1}^M$, $A=\{w_t^A\}_{t=1}^N$. Where $w_t$ represents a word at a position or a time step t in a sequence.

In the simplest form where only the previous query in the conversation history is used as context, C becomes: $C=Q_{-1}$. For simplicity, the subscripts are removed from C and $Q_0$ and are represented as: $C=\{w_t^C\}_{t=1}^N$, $Q=\{w_t^Q\}_{t=1}^M$.

The goal remains as: $F(\{w_t^C\}_{t=1}^C, \{w_t^Q\}_{t=1}^M) \rightarrow \{w_t^{Q'}\}_{t=1}^P$. Words generated in Q': $w_t^{Q'}$ are either from context: $\{w_t^C\}_{t=1}^N$ or the current input query: $\{w_t^Q\}_{t=1}^M$, or any word from vocabulary.

The problem of CQU may be solved through use of specialized sequence to sequence modeling. The dataset for developing models for the machine processors to perform sequence to sequence modeling is specialized as the target dataset includes a large set of general conversational question and result data.

It will be appreciated that the computing device 115 may be integrated into the device 110 and in particular embodiments may include a variety of voice, text, or other communication interfaces, and may operate to collect a variety of location and context information of a user for personal customization of information and actions. In some embodiments, the device 110 may be a personal virtual assistant (PVA). Examples of PVAs in sample embodiments include MICROSOFT® Cortana, AMAZON® Alexa, GOOGLE® Assistant, APPLE® Siri, SAMSUNG® Bixby, among others, but it will be understood that the techniques discussed herein are not limited to any particular implementation of a PVA. Further, while the terminology used herein may relate to specific programming techniques and interfaces provided by the MICROSOFT® Cortana PVA, it will be understood that similar programming techniques and interfaces might be incorporated by other services and companies (including third-party companies that integrate or customize other features of such PVAs). It will also be appreciated that the PVA may be implemented as a hardware device comprising a housing for the processing circuitry, one or more speakers, one or more sensing devices, and a memory device including implementing software or may be implemented on a more generic software platform like Cortana™ on Windows OS™ available from Microsoft Corporation (which may involve a number of cloud components), or a combination of the hardware device and software platform.

The query machine learning processor 150, the attention calculator 155, the context machine learning processor 160, and the query formulator 165 may be implemented in a single computing device 115, the device 110, or across a variety of devices. In some embodiments, the functions performed by the query machine learning processor 150, the attention calculator 155, the context machine learning processor 160, and the query formulator 165 may be completed by a single component or may be arranged across the components of the conversational query understanding engine 145.

Figure 2:
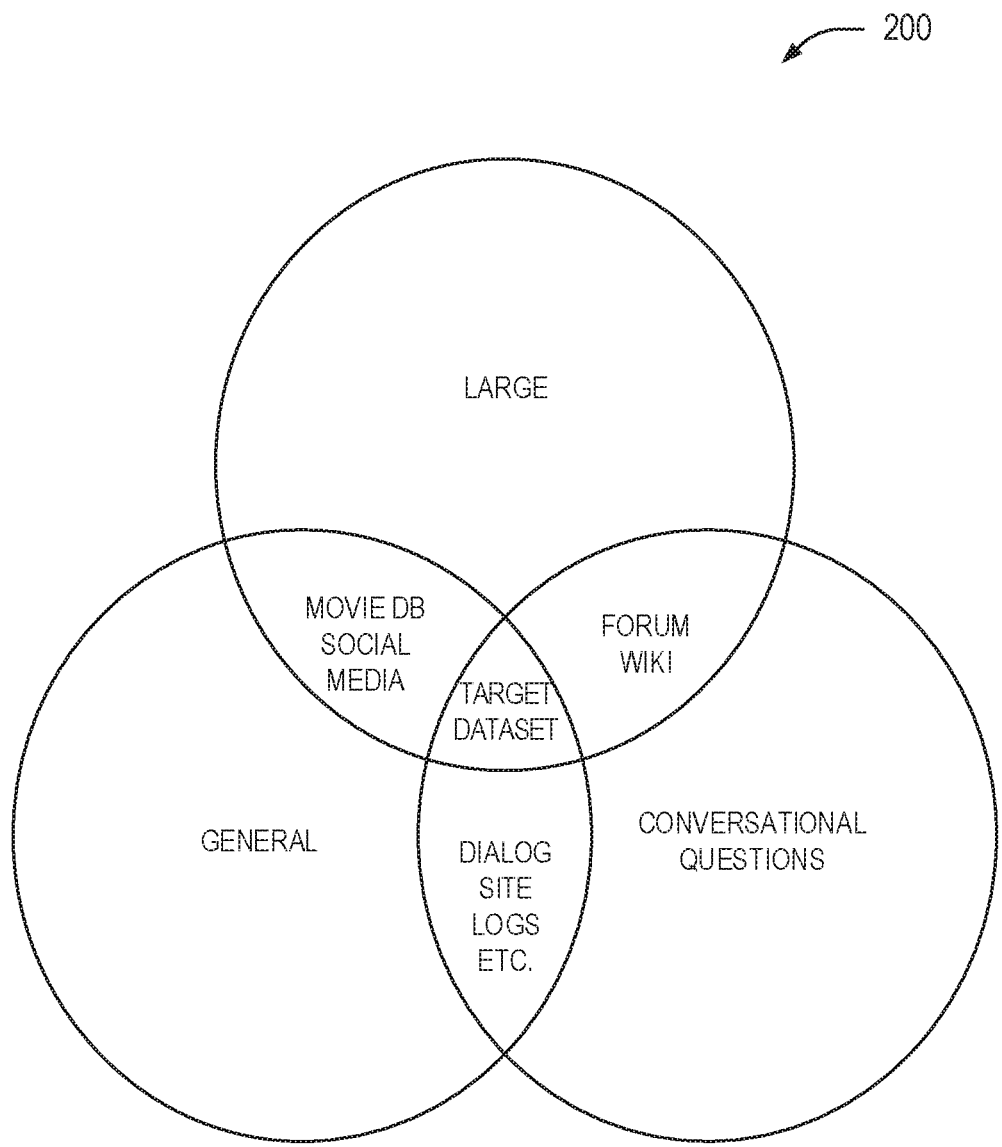
FIG. 2 illustrates an example of a Venn diagram for dataset selection for sequence to sequence conversational query understanding, according to an embodiment.

FIG. 2 illustrates an example of a Venn diagram 200 for dataset selection for sequence to sequence conversational query understanding, according to an embodiment. To apply deep learning for open domain CQU, a dataset that meets the following criteria is used: large (e.g., at least tens of thousands of samples), general (e.g., not domain/task specific), and containing conversational questions. The dataset is used for initial training of the machine learning models (e.g., those used by the query machine learning processor 150 and the context machine learning processor 160 as described in FIG. 1). The training may generate neural pathways and layers in the neural networks of the machine learning models.

The layers and pathways may be traversed from a long short-term memory (LSTM) unit of a word to evaluate whether the word is indicative of a stand-alone query (e.g., does not need additional context to provide accurate results, etc.) or a query that needs to be reformulated (e.g., needs additional context to provide accurate results, etc.). The pathways and layers may also be traversed to determine relationships between a word or words in the query and a word or words in context from pervious queries and corresponding query results. For example, an evaluation of the neural pathways may reveal, based on learned pathways from training data, that a query asking "what about John Doe?" a period of time after a query was submitted asking "how tall is Steve Smith?" lacks the context of a height statistic in the query about John Doe. In this case, the query "what about John Doe?" may be reformulated to "how tall is John Doe?" based on the evaluation. The evaluation may indicate a likelihood that the follow-up query missing a statistic is related (e.g., contains the context for, etc.) to the "how tall is" in the previous query asking "how tall is Steve Smith?". Thus, a query missing context may be looking for inherited context (e.g., the requested statistic, etc.) from the previous query.

A large, general, and conversational dataset may reduce the length of time between initialization of the machine learning processors and effective performance. Once the initial training is completed, the machine learning processors may continually refine the neural pathways by using the results and user feedback (e.g., manually reformulated queries, etc.) from outputs as additional training data.

Movie dialogue and social media datasets were both large and general (e.g., not domain specific). However, they contained few conversational questions and it would be difficult to filter for conversational questions. A tech support chat log and a wild page editor talk page are both large and may contain good examples of conversational questions, but they were domain specific so they do not make ideal datasets. Dialog site logs (e.g., voice assistant, conversational websites, etc.) included general conversational data. However, the sample counts are low. The available datasets do not contain a large quantity of general conversational questions so the target dataset is created anew.

To create the target seed dataset, search engine query logs are mined for triplets of consecutive queries from the same user session. A triplet consists of three consecutive queries: query 1, query 2, and query 3. The queries are already stored in sessions based on the search engine definition of session. Filtering logic is applied to obtain the triplets where: query 1 may be any query, query 2 is a conversational query that depends on context from query 1, query 3 is the user's own reformulation of query 2 that includes context from query 1, because the search engine was not able to correctly understand the conversational query 2. For example: query 1="when was California founded", query 2="who is its governor", query 3="who is California's governor". Note that query 2 is conversational and it was reformulated to query 3, which is non-conversational and may be a stand-alone query.

Criteria in the filtering logic includes: query 2 doesn't result in any clicks (e.g., implies that the search engine did not understand the query and did not return adequate results), query 3 does result in a user click (e.g., implies that the search engine did understand the query and did return a good result), query 3 consists of terms from query 2 and terms from query 1 that weren't in query 2 (e.g., implies that query 3 is a reformulation of query 2 to include context from query 1), query 3 was issued within 30 seconds of query 2 (e.g., implies that the user noticed quickly that the search engine clearly did not understand query 2, and immediately reformulated it to query 3).

The criteria combined with the fact that the search engine currently has low coverage for conversational queries and returns unsatisfactory results leads to the assumption that query 2 is a conversational query that depends on context from query 1. The task of CQU includes reformulating the conversational query to include the correct context. Therefore, query 1 and query 2 (e.g., previous query and current query) are treated as the inputs and query 3 (e.g., reformulation of current query) is treated as the desired output.

The triplets are the positive samples. Negative samples are also mined to identify queries where no reformulation was needed. This is done by applying a filtering logic with the criteria that query 2 already resulted in a user click (e.g., implying that the search engine understood query 2 and returned an adequate result). In this case, no user reformulation was needed, so query 2 is set to also be query 3. For example: query 1 may provide, "where is California", query 2 may provide, "how to split string in python", query 3 may provide "how to split string in python". For these queries, query 2 is not reformulated so the desired output, query 3, is the original query 2. These negative samples are added so that a model trained on this dataset also learns whether or not a query depends on previous context (e.g., whether a query needs to be reformulated).

In an example, the filtering logic for both positive and negative samples are not perfect and will result in some false positive/negative samples. This is not surprising because if there was a perfect filtering logic for conversational queries, then the task of CQU would be solved by simply applying that logic. However, the noisy samples are not a significant problem because the large size of the dataset makes it easier for a model to separate out noise.

In many settings, the conversational queries may comprise a relatively small percentage of the overall queries. However, because of the massive amounts of data in search engine logs, the dataset may be large enough to train deep learning and machine learning models. The dataset used for the models may include thousands or millions of positive and negative samples. The dataset is derived from filtering a subset of search engine logs so additional samples are obtainable. As new data continues to come in via the search engine and as results from the initially trained model are obtained, the dataset continues to grow. Thus, the model becomes increasingly effective at identifying queries that require reformulation and identifying the context from previous queries to use as context in a current query. For example, the model may be integrated into a search engine which may be configured to automatically feed query history and reformulations into a training data pool that may be accessed by the machine learning processor to retrain the models in real-time or near real-time.

Another advantage of the dataset is that it includes free human-defined labels. With the use of this data set, there is no need to involve crowdsourced judges or use other mechanisms to generate labels. Search engine data is a comprehensive and diverse set of question data, making the resulting dataset comprehensive and diverse. Search engine data further contains a wide range of context that is passed between queries including data such as, for example, various named entities, concepts/noun phrases, and verbs. Therefore, the target dataset resulting from filtering the search results represents a large scale and general dataset of conversational questions.

Figure 3:
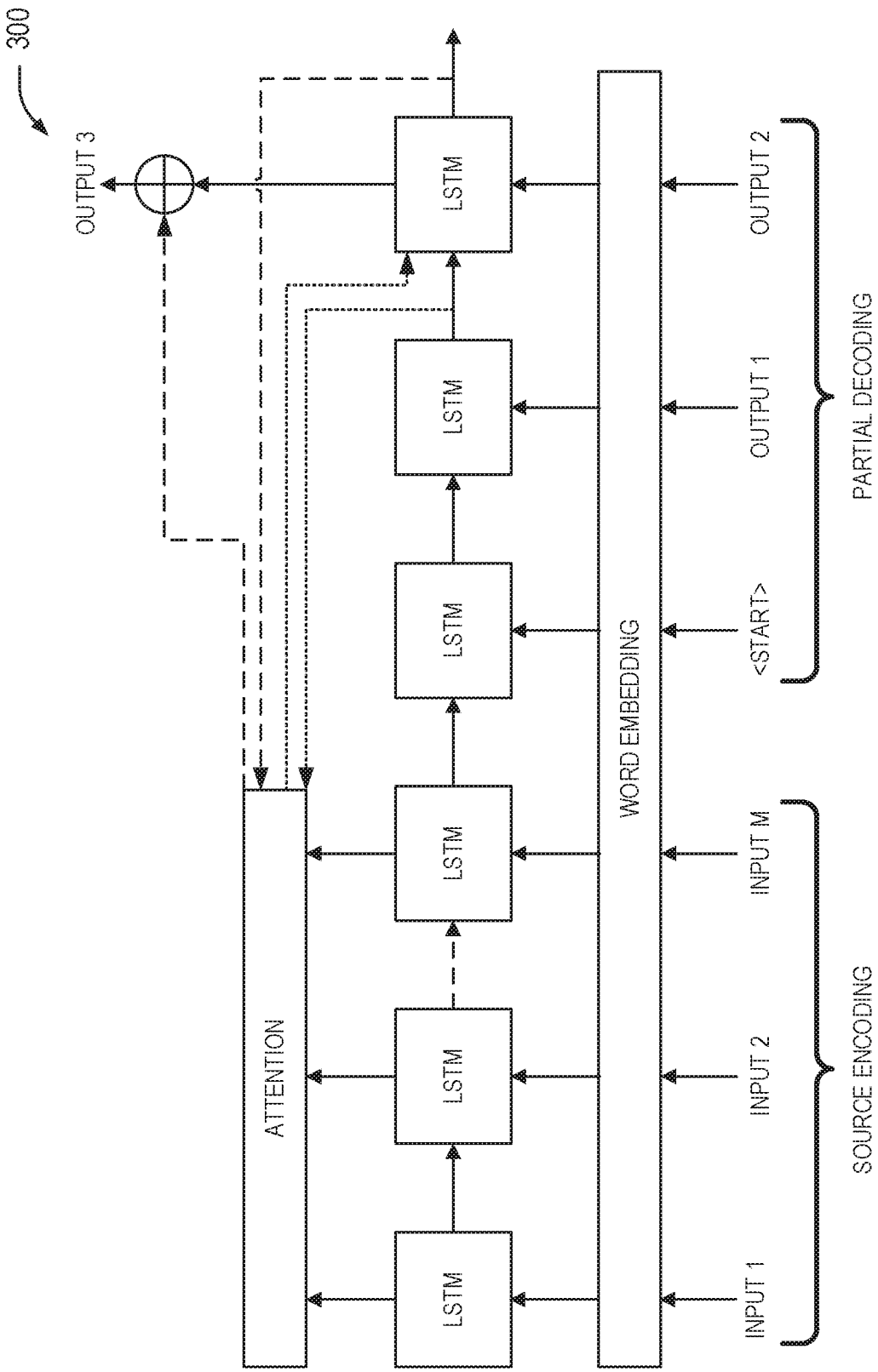
FIG. 3 illustrates an example of a general sequence to sequence model with attention for sequence to sequence conversational query understanding, according to an embodiment.

FIG. 3 illustrates an example of a general sequence to sequence model with attention 300 for sequence to sequence conversational query understanding, according to an embodiment. In the general sequence to sequence scenario, a collection of source-target sequence pairs is given, and the task is to learn to generate target sequences from source sequences. S and T may represent a source sequence and a target sequence respectively in the equation: $S=\{w_t^S\}_{t=1}^M$, $T=\{w_t^T\}_{t=1}^N$. Words in S and T may be from different vocabularies similar to words in a machine translation task or may be from the same vocabulary similar to a text summarization task. Sequences S and T may have different lengths which inherently possesses the many-to-many property.

Sequence to sequence models may be considered as part of a broader class of encoder-decoder models that utilize an encoding stage and a decoding stage. In the encoding stage, an encoder is used to transform the source sequence into an encoded representation. There are many different types of encoders targeting different source domains. The conversational query understanding engine may use various forms of encoders. In an example, a general recurrent neural network (RNN) is used to present the encoding process as such:

$$u_t^S = RNN^S(u_{t-1}^S, e_t^S) \qquad (1)$$

In this example, $e_t^S$ is the word embedding representation of word $w_t^S$ in source sequence: $S=(e_t^S)_{t=1}^M$, where $u_t^S$ represents the internal RNN state at time step t. After running the RNN through the whole source sequence, $u^S=\{u_t^S\}_{t=1}^M$ is obtained, which is considered as the encoded representation of the source sequence. Instead of using the whole sequence $u^S$ to represent the encoded representation of the source, the last RNN state, $u_M^S$, is used in decoding.

Once the source sequence is encoded, sequence to sequence models generate a target sequence in the decoding stage. In this stage, a decoder (which, in the example in FIG. 3, is another RNN) generates one word at a time sequentially by conditioning on the source sequence and on the words generated previously.

$$s_t = RNN^T(s_{t-1}, h(y_{t-1}, S)) \qquad (2)$$

$$p(y_t|y_{<t}, S) = g(s_t) \qquad (3)$$

Here $s_t$ represents the internal state of RNN at time t, and $y_t$ represents the word generated at time t. Here, bold font $y_t$ is used to represent $y_t$'s corresponding word embedding representation. g is usually an affine layer then followed by a softmax layer. Dependence on S may be conducted by setting $s_0$ to be $u_M^S$ which conveys information from source to target. With that, $h(y_{t-1}, S)=y_{t-1}$ is set.

In a further example, the sequence to sequence framework is combined with an attention mechanism (e.g., word importance evaluation, etc.) that significantly improves sequence to sequence model performance. Instead of using fixed vectors (e.g., $u^S$) to represent the source sequence S during decoding, attention brings in a dynamically changing attention vector $c_t$ in the decoding process.

$$c_t = \sum_{k=1}^M \alpha_{t,k} u_k^S \qquad (4)$$

$$\alpha_{t,k} = \frac{e^{f(s_t, u_k^S)}}{\sum_{k'} e^{f(s_t, u_{k'}^S)}} \qquad (5)$$

Equations 4 and 5 compute $c_t$. Intuitively, $\alpha_{t,k}$ represents the strength of attention on the $k^{th}$ word in the source sequence at time step t during decoding. In equation 5, $f$ is the attention function which might be a multi-layer neural network with non-linear layers. The value for $c_t$ is computed by weighted summing all words' encoded representation in the source sequence based on their corresponding attention strength. With the attention mechanism, the decoding process then becomes:

$$s_t = RNN^T(s_{t-1}, h(y_{t-1}, c_{t-1})) \qquad (6)$$

The values of $y_{t-1}$ and $c_{t-1}$ may be concatenated to form:

$$h(y_{t-1}, c_{t-1}) = [y_{t-1}, c_{t-1}]$$

Equation 3 then becomes:

$$p(y_t|y_{<t}, S) = g(s_t, c_t) \qquad (7)$$

In this example, there is an attention layer above the RNN cell and $g(s_t, c_t) = g([s_t, c_t])$. FIG. 3 illustrates the general sequence to sequence model with attention, where LSTM is selected as a RNN cell and the <START> token is used to kick off the decoding process.

The unique property of this query reformulation problem, which does not exist in general sequence to sequence settings, is that there are two source sequences as inputs: 1) context $C=\{w_t^C\}_{t=1}^N$ and 2) current query $Q=\{w_t^Q\}_{t=1}^M$. A first approach may involve concatenating C and Q to form one source sequence, and then adopting the general sequence to sequence directly as:

$$S=[\{w_t^C\}_{t=1}^N, \_SEP, \{w_t^Q\}_{t=1}^M]$$

Where _SEP represents a special word used to be able to separate context and query sequences. This approach is also considered as a baseline, and advanced approaches discussed later build on top of this simplified approach.

Figure 4:
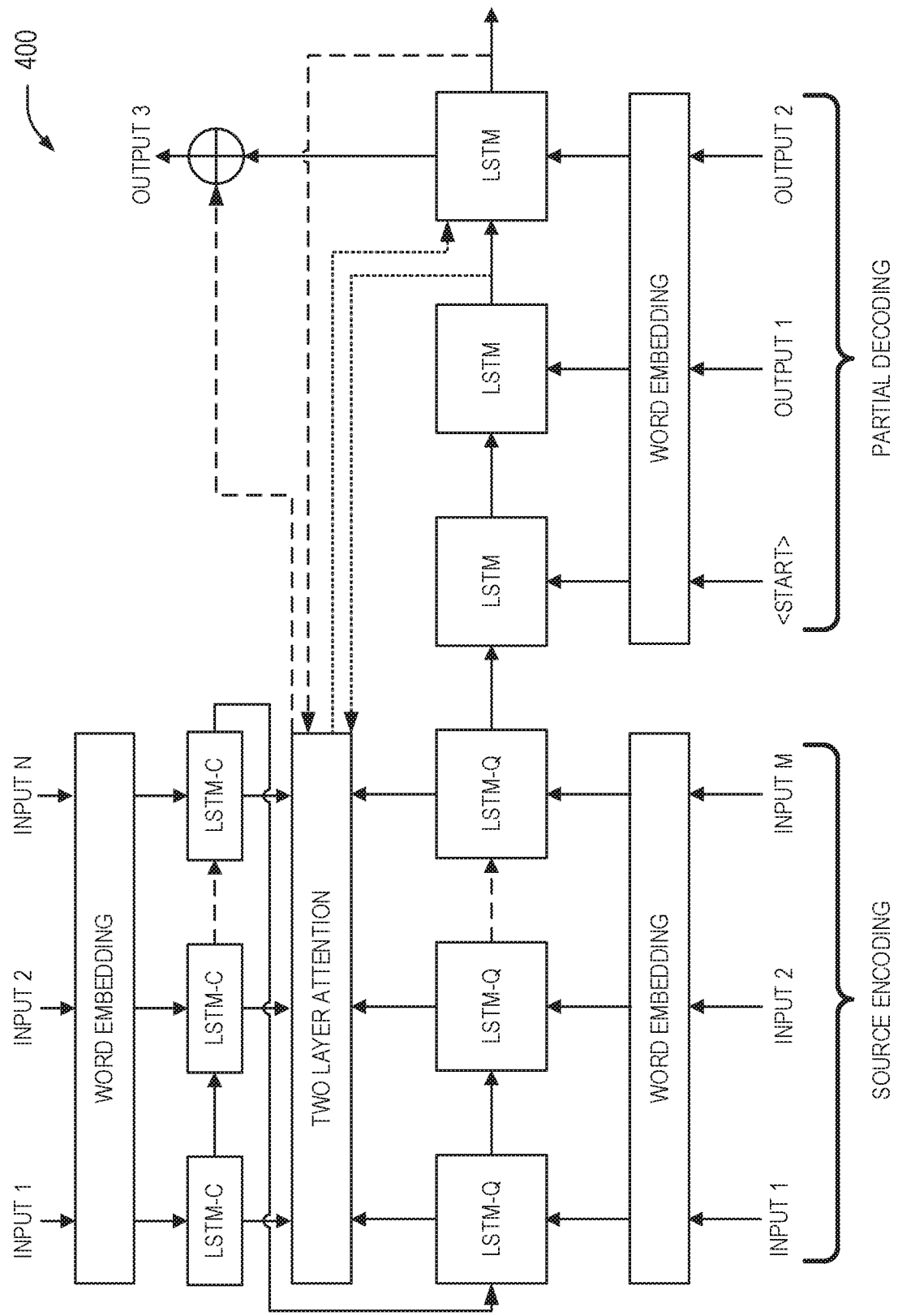
FIG. 4 illustrates an example of a pair sequence to sequence model with two layers of attention for sequence to sequence conversational query understanding, according to an embodiment.

FIG. 4 illustrates an example of a pair sequence to sequence model with two layers of attention 400 for sequence to sequence conversational query understanding, according to an embodiment. Instead of concatenating context and query sequences, they are evaluated separately and use different RNNs to encode them:

$$u_t^C = RNN^C(u_{t-1}^C, e_t^C)$$

$$u_t^Q = RNN^Q(u_{t-1}^Q, e_t^Q)$$

In this example, $u_0^Q$ is set to be $u_N^C$ to pass information from context to current query as in a conversation flow. With this encoding process, we obtain the encoded context representation $u^C=\{u_t^C\}_{t=1}^N$ is obtained, and the encoded query representation is $u^Q=\{u_t^Q\}_{t=1}^M$.

In the decoding stage, $u_M^Q$ is used to initialize RNN state $s_0$. A traditional attention mechanism is expanded to a two-layer attention.

Figure 5:
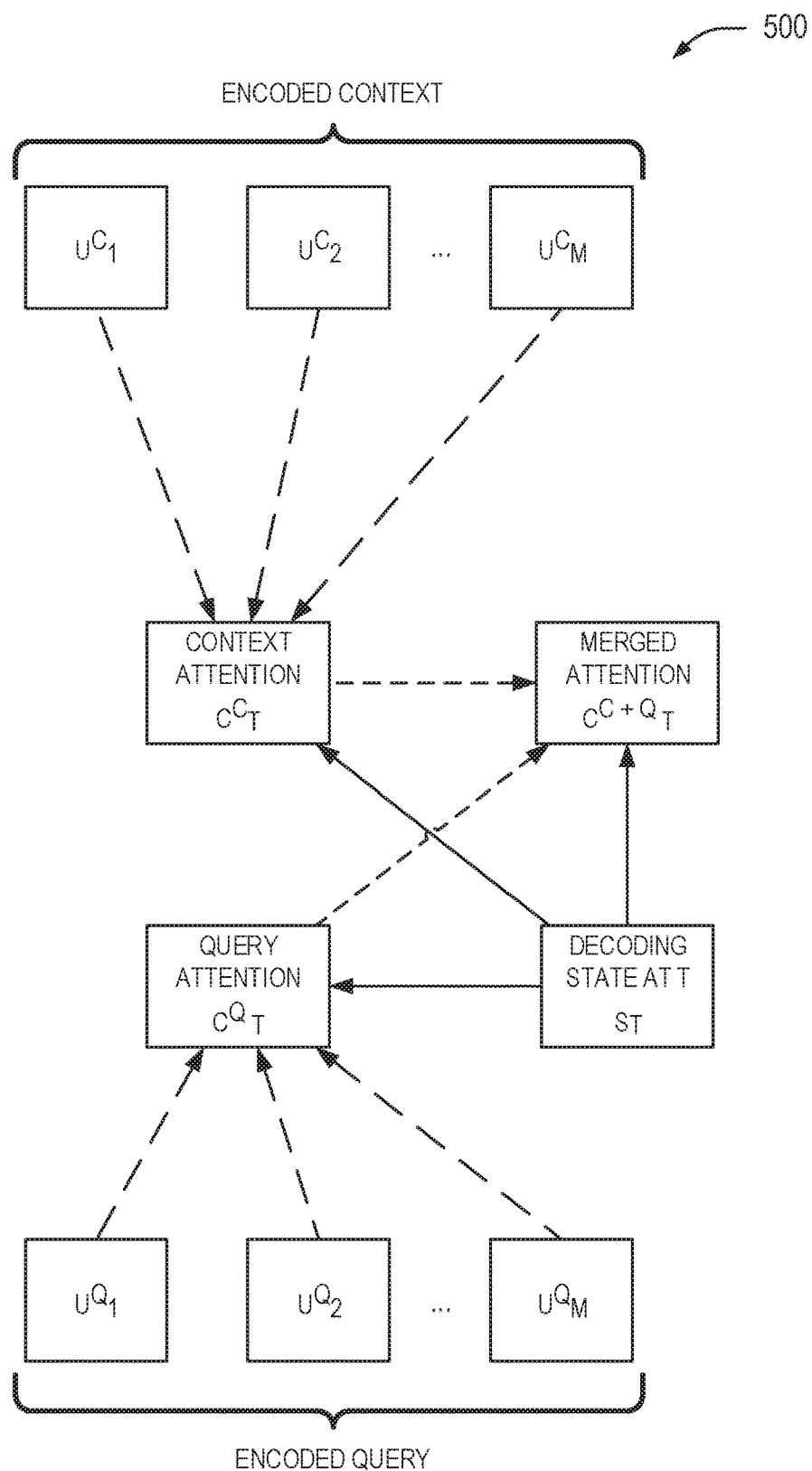
FIG. 5 illustrates an example of computation of attention vectors for sequence to sequence conversational query understanding, according to an embodiment.

FIG. 5 illustrates an example of computation of attention vectors 500 for sequence to sequence conversational query understanding, according to an embodiment. First, attention is conducted on context and query sequences separately and independently:

$$c_t^C = \sum_{k=1}^{N} \alpha_{t,k}^C u_k^C$$

$$c_t^Q = \sum_{k=1}^{M} \alpha_{t,k}^Q u_k^Q$$

$$\alpha_{t,k}^C = \frac{e^{f(s_t, u_k^C)}}{\sum_{k'} e^{f(s_t, u_{k'}^C)}}$$

$$\alpha_{t,k}^Q = \frac{e^{f(s_t, u_k^Q)}}{\sum_{k'} e^{f(s_t, u_{k'}^Q)}}$$

Second, another attention is conducted to merge attention vectors $c_t^C$ and $c_t^Q$:

$$c_t^{C+Q} = \alpha\_a_{t,k}^C c_t^C + \alpha\_a_{t,k}^Q c_t^Q$$

$$a\_\alpha_{t,k}^C = \frac{e^{f(s_t, c_t^C)}}{e^{f(s_t, c_t^C)} + e^{f(s_t, c_t^Q)}}$$

$$a\_\alpha_{t,k}^Q = \frac{e^{f(s_t, c_t^Q)}}{e^{f(s_t, c_t^C)} + e^{f(s_t, c_t^Q)}}$$

where $\alpha\_\alpha_{t,k}^C$ and $\alpha\_\alpha_{t,k}^Q$ may be considered as attention strength at sequence level on context and query respectively. $c_t^{C+Q}$ is the weighted-sum vector of $c_t^C$ and $c_t^Q$, may be used as the final attention vector for decoding. The rest of the decoding may be same as general sequence to sequence using Equations 6 and 7 as shown in the description of FIG. 3.

Keeping context evaluation and query evaluation separately (e.g., using the context machine learning processor 160 and query machine learning processor 150 as described in FIG. 1, respectively) when encoding makes the overall model structure more flexible. This separation provides better support for incorporating richer context in the future, such as including multiple previous turns from the conversation history with both queries and answers. Furthermore, it empowers the model to more efficiently and deeply capture the relationship between the context and query, instead of just concatenating them and treating them equally.

Figure 6:
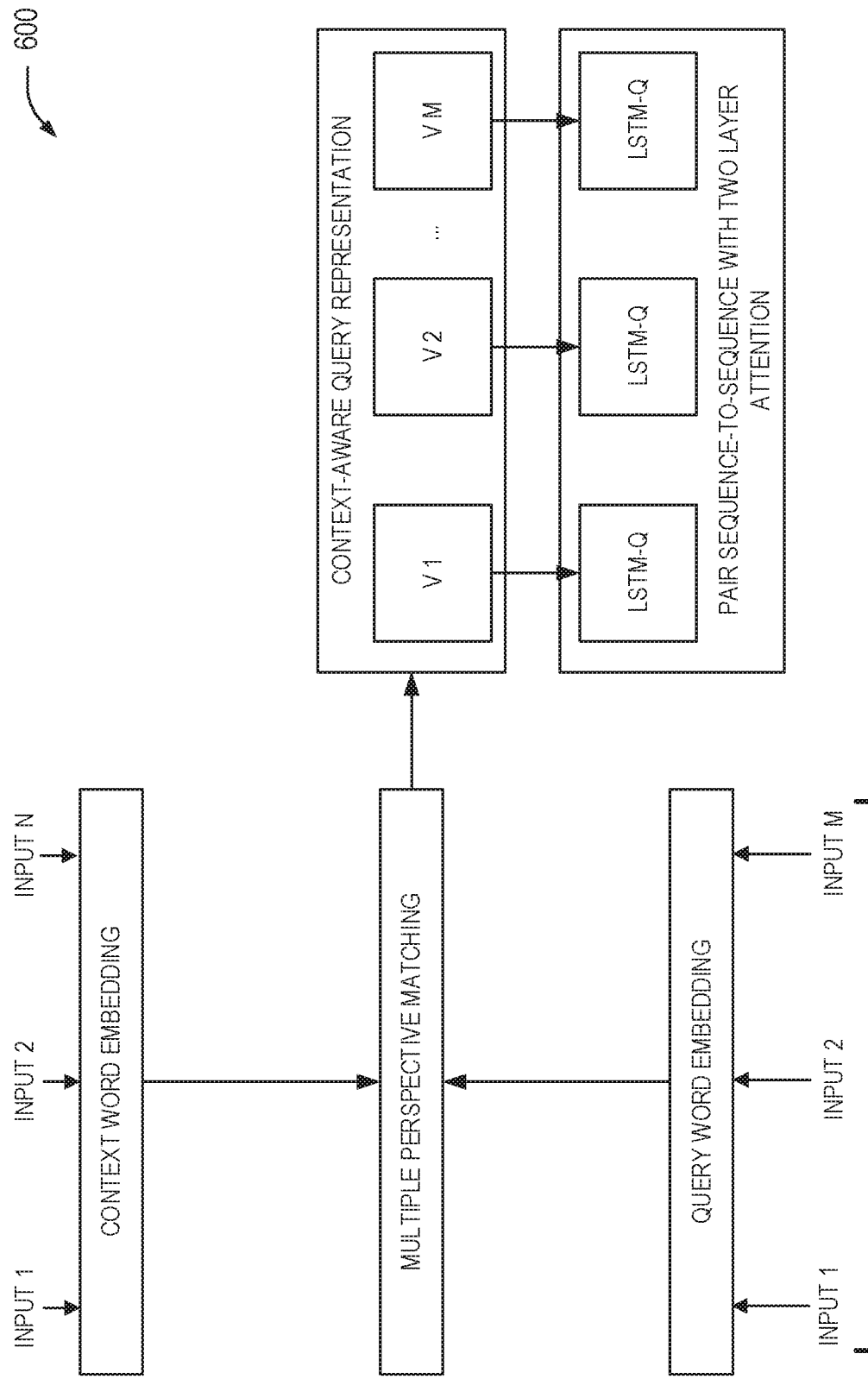
FIG. 6 illustrates an example of a pair sequence to sequence model with two layers of attention with context embedding from multiple perspective matching for sequence to sequence conversational query understanding, according to an embodiment.

FIG. 6 illustrates an example of a pair sequence to sequence model with two layers of attention with context embedding from multiple perspective matching 600 for sequence to sequence conversational query understanding, according to an embodiment. In this example, a model that embeds context information into query sequence during encoding may be developed from the pair sequence to sequence model that captures the semantic relationship between context and query.

In an encoding stage, the context sequence is encoded as is the case in the pair sequence to sequence model. Then, the query sequence is encoded. The attention mechanism is applied over the context when encoding the query.

$$c_t^{QC} = \sum_{k=1}^{N} \alpha_{t,k}^{QC} u_k^C \tag{8}$$

$$\alpha_{t,k}^{QC} = \frac{e^{f(u_t^Q, u_k^C)}}{\sum_{k'} e^{f(u_t^Q, u_{k'}^C)}} \tag{9}$$

In Equations 8 and 9 $\alpha_{t,k}^{QC}$ represents the attention strength on the $k^{th}$ word in context sequence at time t while encoding query, where $c_t^{QC}$ is the corresponding weighted-sum vector over the encoded context representation. In this example, the query encoder becomes:

$$u_t^Q = RNN^Q(u_{t-1}^Q, [e_t^Q, c_{t-1}^{QC}])$$

The decoding stage remains the same as for the pair sequence to sequence model.

The unique property of this approach is the computation of $c_t^{QC}$ and its embedded usage. The attention mechanism enables $c_t^{QC}$ to capture matching information between each word in query sequence to all words in context sequence. This additional information may produce better source representations to be used for decoding.

Multiple perspective matching (MP-matching) may be used to measure a similarity between two natural language sentences. MP-matching is used to compute a new and more advanced context embedding $c_t^{QC}$. In MP-matching, a multiple perspective matching function $f_m$ may compute a similarity of two vectors as follows:

$$m = f_m(v_1, v_2; W)$$

where $v_1$ and $v_2$ are two same size vectors, e.g. with dimension d, $W \in R^{l \times d}$ is a trainable parameter with l represents the number of perspectives. The returned value of m is an l-dimensional vector $m = [m_1, \ldots, m_l]$, with one dimension $m_k \in m$ representing the matching score from the $k^{th}$ perspective. $m_k$ is calculated by the following formula:

$$m_k = \cosine(W_k \odot v_1, W_k \odot v_2)$$

where $\odot$ is the element-wise multiplication, and $W_k$ is the $k^{th}$ row of W.

In an example, four matching strategies based on $f_m$ may be used. In the following, BiRNN represents a bi-directional RNN. In some embodiments, the context and the query may be encoded using the same RNN. Before matching query against context, they are encoded to new representations:

$$\overrightarrow{u_t^C}, \overleftarrow{u_t^C} = BiRNN(u_{t-}^C, e_t^C)$$

$$\overrightarrow{u_t^Q}, \overleftarrow{u_t^Q} = BiRNN(u_{t-1}^Q, e_t^Q)$$

1. Full matching. In this strategy, each time step of the query representation $\overrightarrow{u_t^Q}$ (or $\overleftarrow{u_t^q}$) is compared with the final time step of the context representation $\overrightarrow{u_t^C}$ (or $\overleftarrow{u_N^C}$) resulting in:

$$\overrightarrow{m_t^{full}} = f_m(\overrightarrow{u_t^Q}, \overrightarrow{u_N^C}; \overrightarrow{W^{full}})$$

2. Max pooling matching. In this strategy, each time step of the query representation $\overrightarrow{u_t^Q}$ (or $\overleftarrow{u_t^q}$) is compared with every time step of the context representation $\overrightarrow{u_t^C}$ (or $\overleftarrow{u_t^C}$), and the maximum value of each dimension is selected with the equation:

$$\overrightarrow{m_t^{max}} = \max_{i \in (1 \ldots N)} f_m(\overrightarrow{u_t^Q}, \overrightarrow{u_i^C}; \overrightarrow{W^{max}})$$

3. Attentive matching. In this strategy, first at each time step of the query representation $\vec{u_t^Q}$ (or $\overleftarrow{u_t^Q}$), attentions over the context representation are computed. Attention weight is computed with cosine similarity using the formula:

$$\vec{a_{t,i}} = \frac{\cosine\left(\vec{u_t^Q}, \vec{u_i^C}\right)}{\sum_{j=1}^{N} \cosine\left(\vec{u_t^Q}, \vec{u_j^C}\right)}$$

$$i = 1, \ldots, N$$

Then, an attention vector over the entire context representation $\vec{u_t^C}$ (or $\overleftarrow{u_t^C}$) is computed by weighted summing all time steps of the context representation:

$$\vec{u_t^{C,mean}} = \Sigma_{i=1}^{N} \vec{a_{t,i}} \vec{u_t^C}$$

Finally, each time step of the query representation is matched with its corresponding attention vector by $f_m$ function:

$$\vec{m_t^{att}} = f_m(\vec{u_t^Q}, \vec{u_t^{C,mean}}; W^{att})$$

4. Max attentive matching. This strategy is similar to attentive matching. In this strategy, the time step of context representation with the highest attention score is chosen (cosine similarity computed by Equation 8) as the attention vector, instead of taking the weighted sum of all time steps of context representation as the attention vector. The phrase $\vec{m_t^{max\_att}}$ is used to represent the max attentive matching vectors.

All the previous match strategies may be additionally applicable to query and context word embedding representations by simply replacing $u^Q$ and $u^C$ with $e^Q$ and $e^C$ respectively and getting rid of "direction". In this model, max attentive matching is expanded with word embedding representations and is represent as: $m_t^{e,max\_att}$.

Applying all strategies together may provide useful results. Therefore, all four matching vectors may be aggregated with an aggregation layer. Matching at each time step in query sequence are concatenated: $m_t^{QC}[\vec{m_t^{full}}, \overleftarrow{m_t^{full}}, \vec{m_t^{max}}, \overleftarrow{m_t^{max}}, \vec{m_t^{att}}, \overleftarrow{m_t^{att}}, \vec{m_t^{max\_att}}, \overleftarrow{m_t^{max\_att}}, m_t^{e,max\_att}]$. Then $\{m_t^{QC}\}_{t=1}^M$ is fed into another RNN:

$$\vec{v_t^{QC}}, \overleftarrow{v_t^{QC}} = \text{BiRNN}^{Agg}(v_{t-1}^{QC}, m_t^{QC})$$

Finally, the context embedding is obtained as:

$$c_t^{QC} = [\vec{v_t^{QC}}, \overleftarrow{v_t^{QC}}]$$

Figure 7:
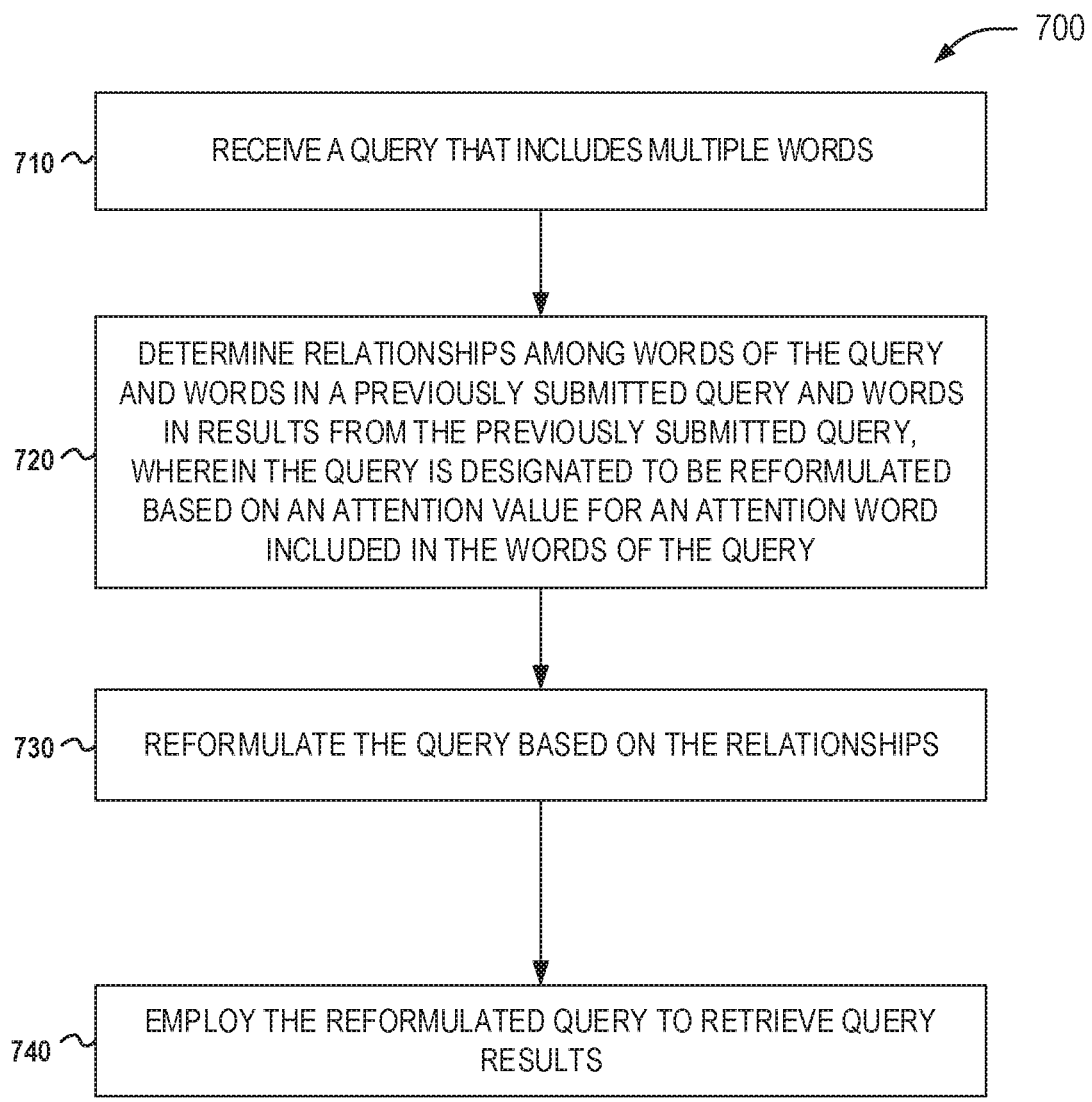
FIG. 7 illustrates an example of a method for sequence to sequence conversational query understanding, according to an embodiment.

FIG. 7 illustrates an example of a method 700 for sequence to sequence conversational query understanding, according to an embodiment. The method 700 may provide the features as described in FIGS. 1-6.

At operation 710, a query may be received (e.g., by IO device 125 as described in FIG. 1, etc.) that includes multiple words. At operation 720, relationships may be determined among the words of the query and words in a previously submitted query and words in results from the previously submitted query (e.g., using the query machine learning processor 150 and the context query machine learning processor 160 as described in FIG. 1, etc.), wherein the query is designated to be reformulated based on an attention value (e.g., as calculated by the attention calculator 155 as described in FIG. 1, etc.) for an attention word included in the words of the query. In an example, the previously submitted query is selected based on a time window prior to receipt of the query. In an example, it may be identified that the query is to be reformulated based on an attention value for an attention word in the query.

In an example, the query may be encoded to identify the words of the query. An attention value may be calculated for each word of the query and the query may be designated as to be reformulated based on a determination that the word of the query with the highest attention value lacks context.

In an example, the words in the previously submitted query and the words in the results from the previously submitted query may be merged into a set of context words. A query word attention value may be calculated for each attention word of the query and a context word attention value for each member of the set of context words. An attention word of the query may be matched to a particular member of the set of context words based on a similarity between the word attention value for the attention word of the query and the context word attention value for the particular member of the set of context words and the relationships may be determined based on the matching.

In an example, the words of the query may be processed using a first recurrent neural network and the words in the previously submitted query and the words in results from the previously submitted query may be processed using a second recurrent neural network and the relationships may be determined by sequence to sequence modeling using the first recurrent neural network and the second recurrent neural network.

At operation 730, the query may be reformulated based on the relationships. In an example, a new query may be generated by adding the particular member of the set of context words to the query. In another example, a new query may be generated by replacing the attention word in the query with the particular member of the set of context words.

In an example, the words in the previously submitted query and the words from results from the previously submitted query may be merged into a set of context words. A first long short-term memory unit may be established for a context word of the set of context words and a second long short-term memory unit may be established for an attention word of the query and a merged attention vector may be created using the first long short-term memory unit and the second long short-term memory unit. The merged attention vector may be used in reformulating the query.

Example Machine and Software Architecture

The components, methods, applications, and so forth described in conjunction with FIGS. 1-7 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes such as those described herein. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosed subject matter in different contexts from the disclosure contained herein.

Figure 8:
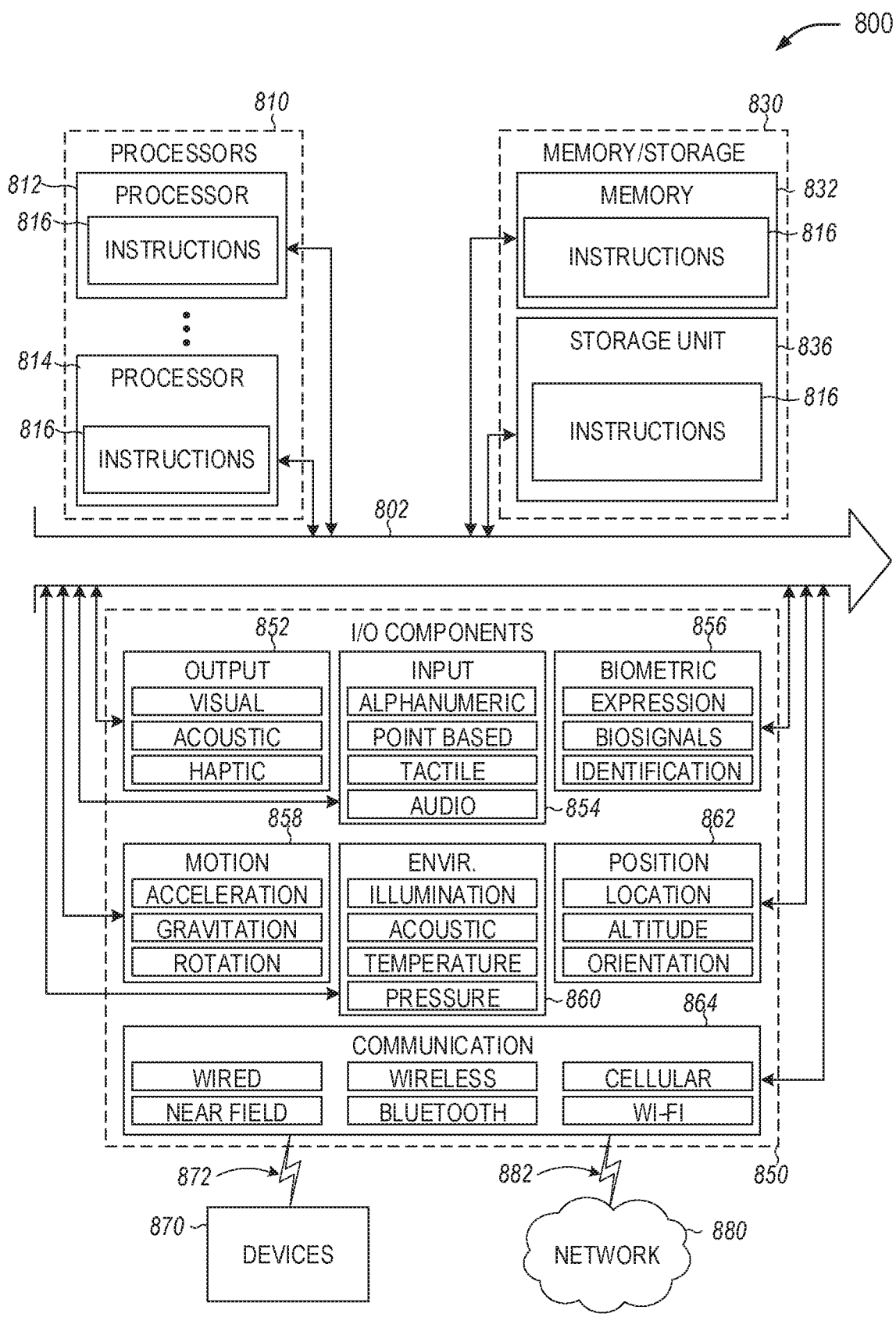
FIG. 8 is a block diagram illustrating an example of a machine upon which one or more embodiments may be implemented.

FIG. 8 is a block diagram illustrating components of a machine 800 which may be a personal virtual assistant (e.g., device 110 as described in FIG. 1), for example, which according to some example embodiments is able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. The instructions 816 transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/storage 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of the processors 810 are examples of machine-readable media.

As used herein, "machine-readable medium" means a device able to store instructions (e.g., instructions 816) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine (e.g., processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. For example, in addition to a speaker, the output components 852 may include a visual output device adapted to provide augmented visual colors, animations, and presentation of information that is determined to best communicate and improve the user's mood to an optimal state as described herein. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure bio-signals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components, or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

In various example embodiments, one or more portions of the network 880 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 7G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Those skilled in the art will appreciate that the personal virtual assistant system described herein provides many technical advantages over conventional personal virtual assistant systems. For example, the personal virtual assistant system described herein improves the user interaction performance, provides contextualized communications, better user understanding and inference processing, more efficient communications as the communications are better targeted to the needs of the user, and improved personalization characteristics, all of which will lead to increased user satisfaction and potentially greater usage of the personal virtual assistant system.

Those skilled in the art also will appreciate that the personal virtual assistant system described herein may be implemented as a standalone consumer electronic device that includes sensors and the AI model running in processing circuitry on-board, and doing online training. Those skilled in the art will further appreciate that the personal virtual assistant described herein may be implemented in an embodiment where the personal virtual assistant system includes sensors but the AI and machine learning features are implemented on the server side via internet communication. For instance, the communications may be sent up to the cloud and the adjustment/retraining of the machine learning model might be done offline by another computer system or in a batch process. On the other hand, the emotional intelligence could live on the PVA device (for performance or privacy reasons) or in the cloud (or a combination of both). These and other embodiments are included within the scope of the following examples.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for conversational query understanding, the system comprising:
at least one processor; and
memory including instructions that, when executed by the at least one processor, cause the at least one processor to perform operations to:
receive, at a computer-implemented sequence to sequence model with an attention mechanism, a query that includes multiple words, wherein the query is a spoken query set forth by a user to a digital assistant as part of a conversation with the digital assistant;
determine, by the sequence to sequence model, relationships among the words of the query and words in a previously submitted query in the conversation and words in results from the previously submitted query, wherein the query is designated to be reformulated based on an attention value for a word included in the words of the query, wherein the attention value is assigned to the word by the attention mechanism, and further wherein the instructions to determine the relationships comprises instructions to:
merge the words in the previously submitted query and the words in the results from the previously submitted query into a set of context words;
calculate a query word attention value for each attention word of the query and a context word attention value for each member of the set of context words; and
match the word of the query to a particular member of the set of context words based on a similarity between the attention value for the word and the context word attention value for the particular member of the set of context words, wherein a relationship is determined based on the matching;
reformulate the query based on the relationships; and
employ the reformulated query to retrieve query results, wherein at least one query result in the query results is returned to the user by way of the digital assistant.

2. The system of claim 1, wherein the instructions to designate the query to be reformulated further comprises instructions to:
encode the query to identify the words of the query;
calculate an attention value for each attention word of the query; and
determine that the attention word of the query with the highest attention value lacks context.

3. The system of claim 1, wherein the instructions to reformulate the query based on the relationships further comprises instructions to generate a new query by replacing the attention word in the query with the particular member of the set of context words.

4. The system of claim 1, wherein the instructions to reformulate the query based on the relationships further comprises instructions to generate a new query by adding the particular member of the set of context words to the query.

5. The system of claim 1, wherein the previously submitted query is selected based on a time window prior to receipt of the query.

6. The system of claim 1, further comprising instructions to:
establish a first long short-term memory unit for a context word of the set of context words and a second long short-term memory unit for an attention word of the query; and
create a merged attention vector using the first long short-term memory unit and the second long short-term memory unit, wherein the instructions to reformulate the query include instructions to use the merged attention vector.

7. The system of claim 1, wherein the instructions to determine relationships among the words of the query and the words in the previously submitted query and the words in results from the previously submitted query further comprises instructions to process the words of the query using a first recurrent neural network and process the words in the previously submitted query and the words in results from the previously submitted query using a second recurrent neural network, wherein the relationships are determined by sequence to sequence modeling using the first recurrent neural network and the second recurrent neural network.

8. The system of claim 1, the instructions further comprising instructions to identify that the query is to be reformulated based on an attention value for an attention word in the query.

9. At least one machine readable medium including instructions for conversational query understanding that, when executed by at least one processor, cause the at least one processor to perform operations to:
receive, from a computing device that executes a digital assistant, a query that includes multiple words, wherein the query was set forth by a user of the computing device to the digital assistant as part of a conversation with the digital assistant;
determine, by a sequence to sequence model having an attention mechanism, relationships among the words of the query and words in a previously submitted query in the conversation and words in results from the previously submitted query, wherein the query is designated to be reformulated based on an attention value for a word included in the words of the query, wherein the attention value is assigned to the word by the attention mechanism, wherein the instructions to determine the relationships among the words of the query and the words in the previously submitted query and results from the previously submitted query further comprises instructions to:
merge the words in the previously submitted query and the words in the results from the previously submitted query into a set of context words;
calculate a query word attention value for each attention word of the query and a context word attention value for each member of the set of context words; and
match the word of the query to a particular member of the set of context words based on a similarity between the word attention value for the word of the query and the context word attention value for the particular member of the set of context words, wherein a relationship is determined based on the matching;
reformulate the query based on the relationships; and
employ the reformulated query to retrieve query results, wherein a query result from the retrieved query results is transmitted to the computing device for presentment to the user by way of the digital assistant.

10. The at least one machine readable medium of claim 9, wherein the instructions to designate the query to be reformulated further comprises instructions to:
encode the query to identify the words of the query;
calculate an attention value for each attention word of the query; and
determine that the attention word of the query with the highest attention value lacks context.

11. The at least one machine readable medium of claim 9, wherein the instructions to reformulate the query based on the relationships further comprises instructions to generate a new query by adding the particular member of the set of context words to the query.

12. The at least one machine readable medium of claim 9, wherein the previously submitted query is selected based on a time window prior to receipt of the query.

13. The at least one machine readable medium of claim 9, further comprising instructions to:
establish a first long short-term memory unit for a context word of the set of context words and a second long short-term memory unit for an attention word of the query; and
create a merged attention vector using the first long short-term memory unit and the second long short-term memory unit, wherein the instructions to reformulate the query include instructions to use the merged attention vector.

14. The at least one machine readable medium of claim 9, wherein the instructions to determine relationships among the words of the query and the words in the previously submitted query and the words in results from the previously submitted query further comprises instructions to process the words of the query using a first recurrent neural network and process the words in the previously submitted query and the words in results from the previously submitted query using a second recurrent neural network, wherein the relationships are determined by sequence to sequence modeling using the first recurrent neural network and the second recurrent neural network.

15. A method for conversational query understanding, performed by a computing system, the method comprising:
receiving, from a computing device that executes a digital assistant, a query that includes multiple words, wherein the query is part of a conversation between a user and the digital assistant;
determining, by a sequence to sequence model with an attention mechanism, relationships among the words of the query and words in a previously submitted query in the conversation and words in results from the previously submitted query, wherein the query is designated to be reformulated based on an attention value for a word included in the words of the query, and further wherein the attention value is assigned to the word by the attention mechanism of the sequence to sequence model, wherein determining relationships among the words of the query and the words in the previously submitted query and the results from the previously submitted query comprises:
merging the words in the previously submitted query and the words in the results from the previously submitted query into a set of context words;
calculating a query word attention value for each attention word of the query and a context word attention value for each member of the set of context words; and
matching the word of the query to a particular member of the set of context words based on a similarity between the word attention value for the word of the query and the context word attention value for the particular member of the set of context words, wherein a relationship is determined based on the matching;
reformulating the query based on the relationships; and
employing the reformulated query to retrieve query results, wherein a query result from the query results is returned to the computing device for presentment to a user by way of the digital assistant.

16. The method of claim 15, wherein designating the query to be reformulated further comprises:
- encoding the query to identify the words of the query;
- calculating an attention value for each word of the query; and
- determining that the word of the query with the highest attention value lacks context.

17. The method of claim 15, further comprising:
- establishing a first long short-term memory unit for a context word of the set of context words and a second long short-term memory unit for an attention word of the query; and
- creating a merged attention vector using the first long short-term memory unit and the second long short-term memory unit, wherein reformulating the query includes using the merged attention vector.

18. The method of claim 15, wherein reformulating the query based on the relationships comprises:
- generating a new query by replacing the attention word in the query with the particular member of the set of context words.

19. The method of claim 15, wherein reformulating the query based on the relationships comprises:
- generating a new query by adding the particular member of the set of context words to the query.

20. The method of claim 15, wherein the previously submitted query is selected based on a time window prior to receipt of the query.

\* \* \* \* \*